(12) United States Patent
McGee et al.

(10) Patent No.: US 7,821,973 B2
(45) Date of Patent: Oct. 26, 2010

(54) SHARING OF HOST BUS ADAPTER CONTEXT

(75) Inventors: Michael Sean McGee, Round Rock, TX (US); Darda M. Chang, Austin, TX (US); Daniel N. Cripe, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 682 days.

(21) Appl. No.: 11/552,322

(22) Filed: Oct. 24, 2006

(65) Prior Publication Data

US 2008/0098148 A1   Apr. 24, 2008

(51) Int. Cl.
    *G06F 13/36*   (2006.01)
(52) U.S. Cl. .................. 370/306; 710/305; 370/242
(58) Field of Classification Search ......... 710/305–306, 710/100, 105; 370/242
See application file for complete search history.

(56) References Cited

U.S. PATENT DOCUMENTS

| | | | |
|---|---|---|---|
| 6,810,396 B1 * | 10/2004 | Blumenau et al. ............... 707/5 |
| 7,149,823 B2 * | 12/2006 | Miller et al. ................... 710/22 |
| 2003/0126315 A1 | 7/2003 | Tan et al. |
| 2004/0039815 A1 | 2/2004 | Evans et al. |
| 2004/0199808 A1 | 10/2004 | Freimuth et al. |
| 2005/0188239 A1 | 8/2005 | Golasky et al. |
| 2006/0015770 A1 | 1/2006 | Dicorpo et al. |
| 2008/0222661 A1 * | 9/2008 | Belyakov et al. ............ 719/321 |

* cited by examiner

*Primary Examiner*—Thomas J Cleary
*Assistant Examiner*—Kim T Huynh

(57) ABSTRACT

A system comprises a first host bus adapter (HBA) that uses a first context to facilitate the transmission of packets through a logical connection through the first HBA. The system also comprises a second HBA and memory in which the first context is stored. The memory is accessible by both of the first and second HBAs. Upon receiving a packet associated with the logical connection, the second HBA accesses the memory to use the first context to process the packet in accordance with the first context.

21 Claims, 3 Drawing Sheets

SHARING OF HOST BUS ADAPTER CONTEXT

BACKGROUND

A host bus adapter (HBA) refers to logic that couples a host system to an external device. More specifically, an HBA provides an interface to a host bus within the host system and another interface to an external device. The host system may comprise a computing device (e.g., a server) and the external device may comprise a storage device or other type of external device. An HBA implements one or more logical connections between the logic in the host system and logic in the external device. A logical connection refers to a path between a source point and a destination point that is defined by source information (e.g., source identifier), destination information (e.g., destination identifier), and other information such as state, type, command, message, data, etc. Each logical connection has logical connection specific information ("context") that the HBA uses to process packets through the logical connection. The context for a logical connection comprises some or all of the aforementioned elements that define the logical connection, such as any or all of the source information, destination information, state, type, command, message, data, a sequence number (which specifies the order in which bytes are sent and received across a network), etc.

An HBA may be unable to continue working correctly. The inability of an HBA to continue working correctly may be due, for example, to a failure of the HBA or a cable becoming disconnected. The inability of an HBA to continue to process packets through the HBA's logical connections is problematic,

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
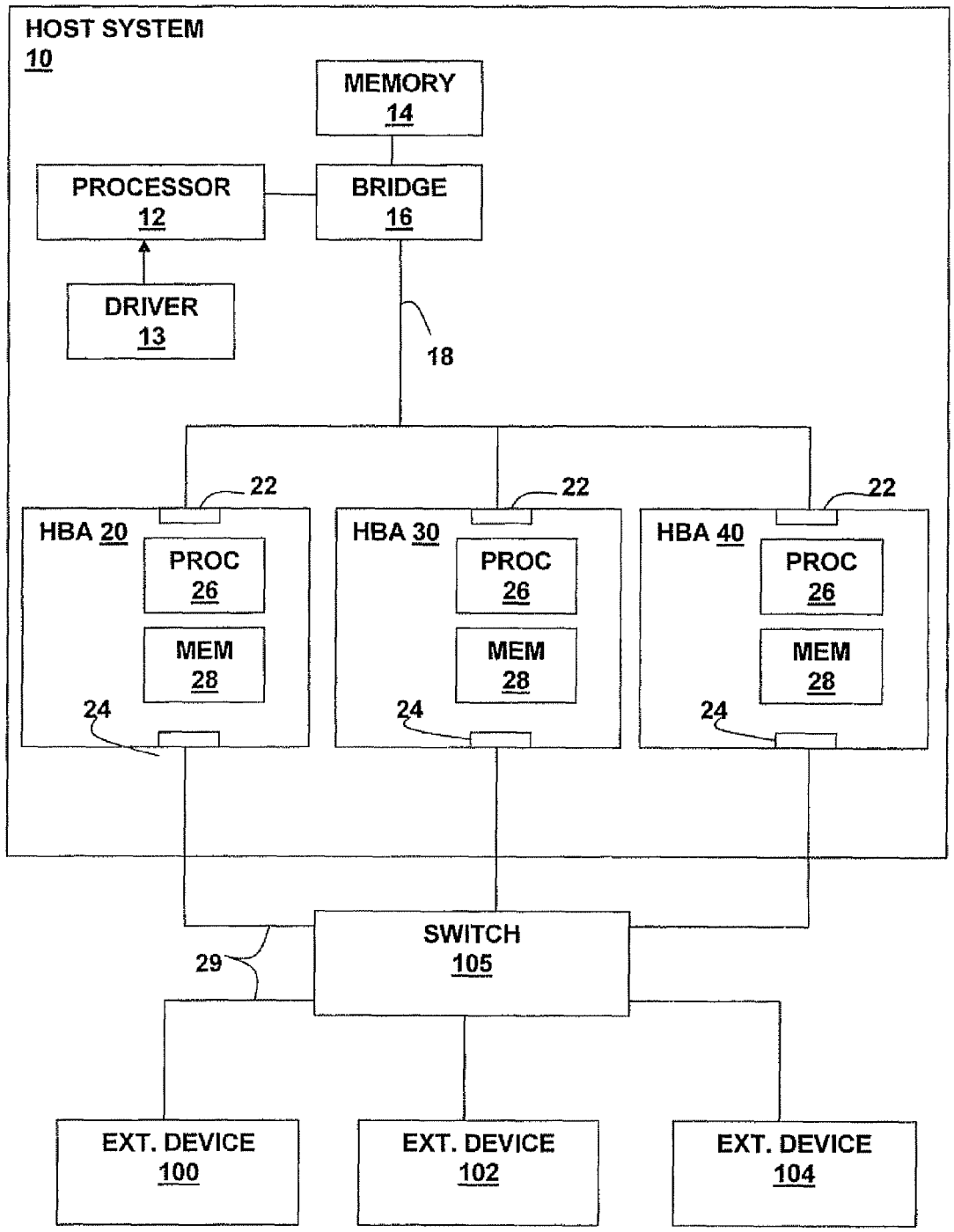
FIG. 1 shows a system in accordance with embodiments of the invention.

FIG. 1 shows a host system 10 in accordance with an embodiment of the invention. The host system 10 may comprise a computing device such as a computer (e.g., a server, desktop, notebook, etc.). The host system 10 comprises a processor 12 and memory 14 coupled to bridge logic 16. The memory 14 functions as the host system's main memory and is referred to as "main" or "system" memory. In accordance with at least some embodiments of the invention, memory 14 comprises volatile memory such as any type of random access memory (RAM).

The bridge logic 16 permits the processor 12 to access the memory 14. The bridge logic 16 also provides a connection to a host bus 18. The host bus can be any suitable type of bus as a Peripheral Component Interconnect (PCI) bus. As shown in FIG. 1, one or more host bus adapters (HBAs) 20, 30, and 40 couple to the host bus 18. As such, each HBA 20, 30, 40 can access memory 14 via the bridge 16 Further, the processor 12 can interact with any of the HBAs 20, 30, 40 via the bridge logic 16 and host bus 18. Each HBA 20, 30, 40 comprises a processor 26, memory 28, an interface 22 to the host bus 18 and another interface 24 to a device external to the host system 10. In the example of FIG. 1, HBAs 20, 30, and 40 couple to externals device 100, 102, and 104 via switch 105. One or more cables 29 are used to interconnect the HBAs 20, 30, and 40, switch 105, and external devices 100-104.

The external devices 100-104 may comprise storage devices such as hard disk drives, tape drives, compact disk read only memory (CD ROM) drives, etc. In other embodiments, the external devices can be other than storage devices Further, the various external devices 100-104 need not all be the same type of device. For example, one external device can be a storage device while another device is a device other than a storage device. Further, one external device can be one type of storage device (erg., a hard disk drive), while another external device can be a different type of storage device (e.g., a CD ROM drive).

Communication between the HBAs 20, 30, 40 and the external devices 100-104 pass through the switch 105. Via the switch 105, one or more or all of the HBAs are operatively coupled to one or more or all of the external devices 100-104. As such, in some embodiments if one HBA (or an associated electrical cable 29) were to fail, one or more of the other HBAs can perform the functions of the failed HBA thereby providing fault tolerance. In addition, in some embodiments having multiple HBAs 20, 30, 40 coupled to external devices 100-104 via a switch 105 enables communications between HBAs and the external devices to be distributed/balanced among the various HBAs.

Each HBA 20, 30, 40 implements one or more logical connections between the host system 10 and one or more of the external devices 100-104. Each logical connection has associated context information that is used by the HBA to process data packets through that logical connection Each HBA can implement multiple logical connections at any point in time, and each such logical connection may have a different context. When an HBA receives a packet from the host system 12 or external device 100-104 targeting the other of the host system or external device, the HBA accesses the context associated with the logical connection to which that packet pertains. The context provides information to permit the HBA to correctly forward the packet to the target device. In the event the logical connection is based on the Transmission Control Protocol/Internet Protocol (TCP/IP) protocol, the context may include such information as a sequence number, source IP address and associated port number, and destination IP address and associated port number It is possible that a given HBA will become unable to process packets. For example, an HBA, which can be implemented as a circuit (e.g., integrated circuit, circuit board, etc.), may malfunction. Further, a cable 29 connecting an HBA to switch 105 may become damaged or disconnected. Other reasons may exist as well preventing an HBA from being usable to process packets through a logical connection. In such a situation, embodiments of the invention comprise a fail-over process by which another HBA takes over for the inoperative HBA. An example of such a fail-over process is described in U.S. Pat. Pub. No. 2003/0126315 entitled "Data Storage Network With Host Transparent Failover Controlled By Host Bus Adapter," incorporated herein by reference. In some embodiments, a person must connect the new HBA via a cable to the external device previously serviced by the inoperative HBA. In other embodiments, the new and inoperative HBAs are connected via the same cable to a common external device—thus, no re-cabling is necessary.

The new HBA (i.e., the HBA that is substituted for the inoperative HBA) implements the logical connections that the inoperative HBA previously implemented. Further, the new HBA uses the inoperative HBA's contexts for each such logical connection to continue processing packets through such logical connections (now available on the new HBA).

In accordance with embodiments of the invention, the new HBA uses the inoperative HBA's contexts without copying the contexts in toto into the new HBA prior to receiving a packet for processing. The inoperative HBA, prior to it becoming inoperative, received a packet, read the corresponding context information, and processed the packet accordingly. The new HBA does not obtain a complete copy of the inoperative HBA's contexts for storage on the new HBA. Instead, the new HBA continues operating in much the same way as the inoperative HBA For example, the new HBA receives a packet for a particular logical connection (previously hosted on the inoperative HBA), reads the relevant information from the context that corresponds to that particular context, and uses that context information as appropriate The fail-over process does not include copying all of the relevant context information to the new HBA. The new HBA reads the needed context information from the same memory source from which the inoperative HBA previously read the context.

At least two embodiments are possible for the new HBA to use the inoperative HBA's contexts. In one such embodiment, each context usable by an HBA is stored in memory 28 internal to that particular HBA. When that HBA fails, the new HBA issues read requests across host bus 18 to the inoperative HBA. Assuming the inoperative HBA is sufficiently operative to at least respond to read requests of its internal memory, the otherwise inoperative HBA supplies the requested context information across bus 18 to the new HBA. The new HBA uses such context information read from the inoperative HBA's own memory to process the packet through the logical channel. In this embodiment, each HBA's memory 28 is sharable by the other HBAs in the event, for example, that another HBA assumes the role of implementing logical connections for an inoperative HBA. As explained above, one HBA can read another HBA's memory 28 across host bus 18 to access that HBA's context. In another embodiment, each HBA is directly connected to at least one other HBA via a separate electrical cable and the context information is accessed via the separate cable. In one such embodiment, the HBAs are daisy-chained together.

Figure 2:
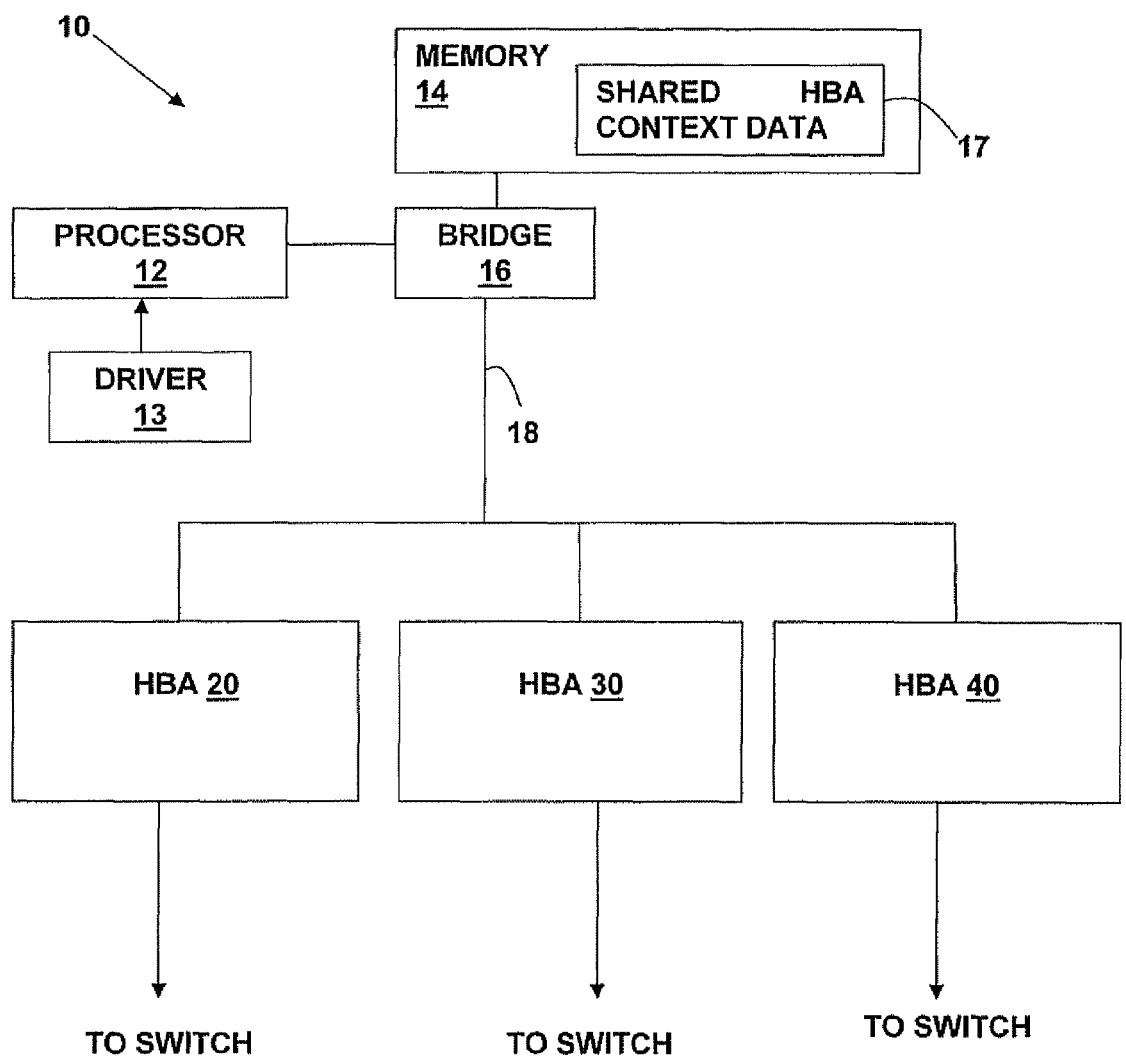
FIG. 2 shows another system in accordance with alternative embodiments of the invention.

In accordance with another embodiment, the context information usable by the HBAs is stored in a centralized memory. FIG. 2 shows an embodiment of system 10 in which memory 14 comprises shared HBA context data 17. Such context data 17 is accessible to each of the HBAs 20, 30, and 40 via host bus 18 and bridge 16. That is, each HBA 20, 30, 40 is able to issue a read request of memory 14 to read the context information from shared HBA context data 17 necessary to process a given packet through a corresponding logical connection. If one HBA becomes inoperative, another HBA can continue to perform the duties of the inoperative HBA as explained above. The new HBA issues read requests to memory 14 to access the same context information from shared HBA context data 17 that the inoperative HBA previously accessed. In some embodiments, the centralized shared memory comprises the host system's main memory (as in the example of FIG. 2). In other embodiments, the centralized shared memory comprises a memory device connected to the host bus 18 or located elsewhere in system 10.

In some situations, an HBA 20, 30, 40 updates a logical connection's context information. An example of a context information update involves the sequence number which is updated for each byte within a packet Because embodiments of the invention permit the context information to be shared between HBAs, the possibility exists that more than one HBA will attempt to use a particular logical connection's context at a given time. In accordance with embodiments of the invention, an HBA 20, 30, 40 "locks" the context information being used to preclude other HBAs from accessing and using such context. Any of a variety of mechanisms for locking the context can be implemented. For example, each context has a token associated therewith. Only an HBA that has ownership of the token can use and/or update the context. Any HBA that does not have that context's token cannot use or update that context. Other mechanisms exist as well for restricting access to a given logical connection's context.

At some point, the inoperative HBA may be repaired or replaced. Once this happens, another fail-over process can be performed to switch responsibility for processing packets through the new HBA's logical connections back to the formerly inoperative HBA, which is now again operational. The new HBA ceases to use the context information of the previously inoperative HBA upon the inoperative HBA being able to continue processing packets. The same type of fail-over process as explained above can be used to switch back to the previous, again operational HBA.

Figure 3:
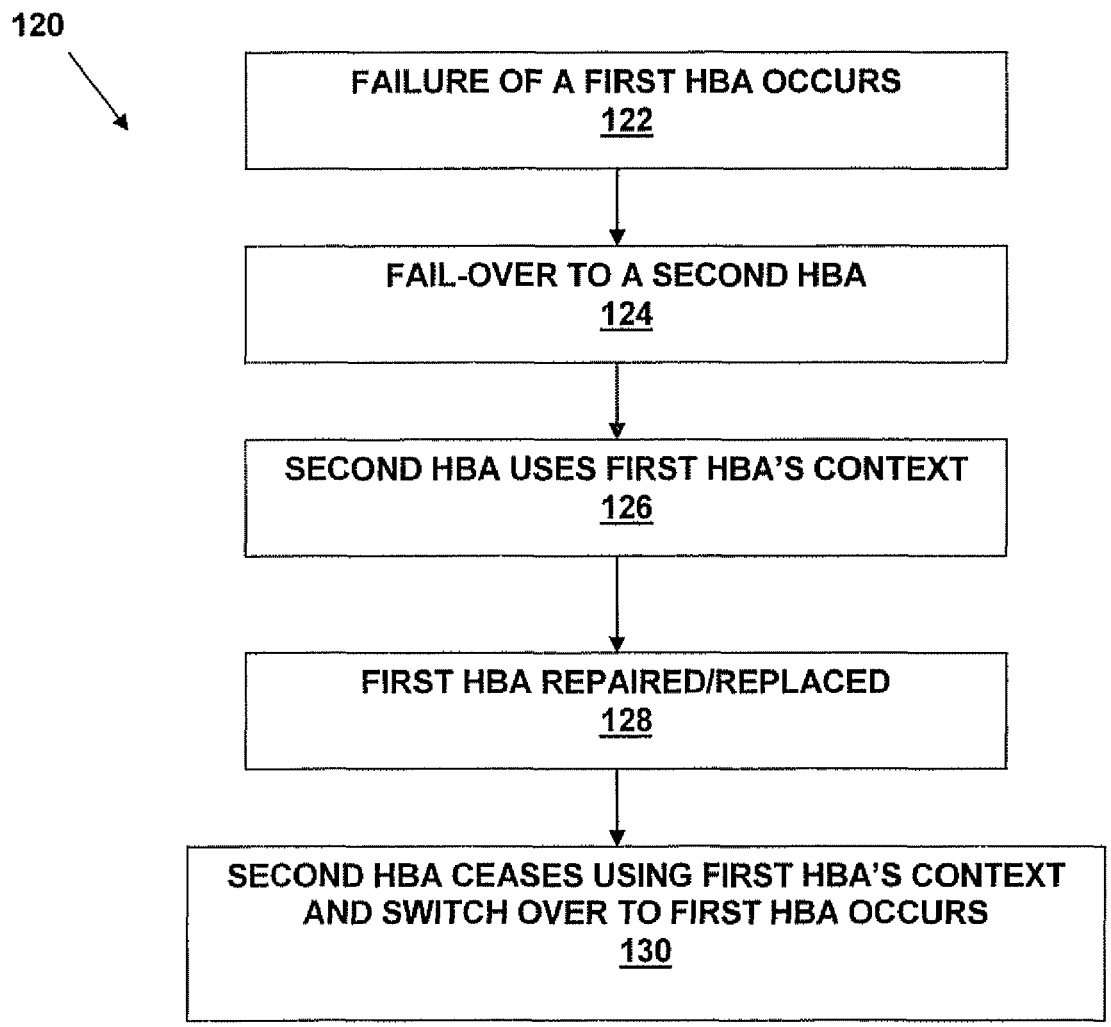
FIG. 3 shows a method in accordance with embodiments of the invention

FIG. 3 shows a method 120 in accordance with an embodiment of the invention. At 122, a failure of a first HBA occurs. At 124, the method comprises failing over to a second HBA. At 126, the method comprises the second HBA using the first HBA's context. Eventually, at 128, the first HBA may be repaired or replaced, and at 130, the second HBA ceases using first HBA's context and a switch back to the first FIBA occurs to continue processing packets.

As described above, each HIBA 20, 30, 40 can use the context information of any other HBA in the system by accessing the context information as such other HBAs would have accessed their own context information. One HBA can use another HBA's context without having to copy such other HBA's context in toto. Accordingly, the capacity of memory 28 of each HBA need not be large enough to accommodate all other HBA's context.

In accordance with another embodiment, the ability of the HIBAs' context to be shared among the HBAs facilitates load sharing For example, one HBA can service a logical connection between the host 10 and a particular external device 100-104 at one point in time, and later another HBA can service that same logical connection. Further, one HBA can service a logical connection for data and commands being provided by the host 10 to the external device 100-104, while another HBA services the same logical connection for data and/or commands being provided by the external device to the host. That the context information associated with the logical connections is shareable amongst the various HBAs enables such load sharing.

Referring again to FIGS. 1 and 2, a software driver 13 is executed by the host system's processor 12. The driver 13 determines the memory address range of the distributed context information of FIG. 1 or the common shared context information of FIG. 2. The driver 13 causes the processor 12 to provide the address mapping of the context information to each HBA 20, 230, and 40 so that each HBA will know where to find all relevant context information.

In accordance with embodiments of the invention, each HBA in the system is capable of functioning as described above. This functionality of each HBA is implemented in some embodiments by that HBA's processor executing software internal to the HBA (i e., firmware).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a first host bus adapter (HBA) that uses a first context to facilitate the transmission of packets through a logical connection through said first HBA, said first HBA modifying said first context;
   a second HBA coupled to said first HBA;
   memory in which said first context is stored, said memory being accessible by both of said first and second HBAs;
   wherein, upon receiving a packet associated with said logical connection, said second HBA accesses said memory to use said first context to process said packet in accordance with said first context, said second HBA modifying said first context.

2. The system of claim 1 wherein said second HBA does not copy the first context to the second HBA prior to receiving said packet.

3. The system of claim 1 wherein said memory is located within said first HBA.

4. The system of claim 1 wherein said memory is located external to both of said first and second HBAs.

5. The system of claim 4 wherein said memory is the system's main memory.

6. The system of claim 1 wherein said second HBA reserves usage of said first context exclusive to said second HBA to preclude other HBAs, if any, from accessing and using said first context.

7. The system of claim 1 wherein said second HBA begins to use said first context upon the first HBA being unable to process packets through said logical connection.

8. The system of claim 7 wherein said second HBA ceases to use said first context upon said first HBA being able to continue processing packets through said logical connection.

9. The system of claim 1 wherein said context comprises at least one of a sequence number, source address, destination address, and port number.

10. A host bus adapter (HBA), comprising:
    a processor;
    interfaces to a host bus and external device;
    wherein said processor causes said HBA, upon receiving a packet, to access context information stored in memory external to said HBA to process said packet, said context information being previously associated with a different HBA;
    wherein said context information has been modified by the different HBA and;
    wherein said processor modifies said context information.

11. The HBA of claim 10 wherein said HBA does not copy the context information from said external memory prior to receiving said packet.

12. The HBA of claim 10 wherein said external memory is located within said different HBA.

13. The HBA of claim 10 wherein said external memory is main memory of a host in which said HBA resides.

14. The HBA of claim 10 wherein said processor locks said context to preclude all other HBAs from accessing and using said context.

15. The HBA. of claim 14 wherein said processor subsequently unlocks said context to permit another HBA to use said context.

16. A method, comprising:
    a first host bus adapter (HBA) using connection specific information to process packets through a logical connection of said first HBA;
    said first HBA modifying said connection specific information;
    a second HBA receiving a packet;
    upon receiving said packet, said second HBA using said connection specific information of said first HBA to process said packet instead of said first HBA; and
    said second HBA modifying said connection specific information.

17. The method of claim 16 further comprising said first HBA failing over to said second HBA.

18. The method of claim 16 wherein said second HBA using said connection specific information comprises reading said connection specific information while processing said packet without copying said connection specific information in toto into said second HBA.

19. The method of claim 16 further comprising said second HBA ceasing to use said connection specific information in favor of said first HBA using said connection specific information.

20. The method of claim 16 further comprising said second HBA causing other HBAs to be precluded from using said connection specific information.

21. The system of claim 1 wherein said context comprises a source address and a destination address.

* * * * *

UNITED STATES PATENT AND TRADEMARK OFFICE
CERTIFICATE OF CORRECTION

PATENT NO. : 7,821,973 B2
APPLICATION NO. : 11/552322
DATED : October 26, 2010
INVENTOR(S) : Michael Sean McGee et al.

Page 1 of 1

It is certified that error appears in the above-identified patent and that said Letters Patent is hereby corrected as shown below:

In column 6, line 25, in Claim 15, delete "HBA." and insert -- HBA --, therefor.

Signed and Sealed this
Eighth Day of March, 2011

David J. Kappos
*Director of the United States Patent and Trademark Office*